(12) United States Patent
Siegel et al.

(10) Patent No.: US 10,628,861 B1
(45) Date of Patent: Apr. 21, 2020

(54) METHOD AND SYSTEM FOR CONDUCTING A CHAT

(71) Applicant: Amazon Technologies, Inc., Seattle, WA (US)

(72) Inventors: Hilliard B. Siegel, Seattle, WA (US); Ashish Agrawal, Seattle, WA (US); Ezra Cooper, Seattle, WA (US); Robert Frederick, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 857 days.

(21) Appl. No.: 14/671,963

(22) Filed: Mar. 27, 2015

Related U.S. Application Data

(62) Division of application No. 13/224,260, filed on Sep. 1, 2011, now Pat. No. 8,997,005, which is a division of application No. 10/279,088, filed on Oct. 23, 2002, now Pat. No. 8,046,259.

(51) Int. Cl.
*G06F 3/00* (2006.01)
*G06Q 30/02* (2012.01)
*H04L 12/58* (2006.01)
*G06F 3/0481* (2013.01)

(52) U.S. Cl.
CPC ....... *G06Q 30/0277* (2013.01); *G06F 3/0481* (2013.01); *H04L 51/04* (2013.01)

(58) Field of Classification Search
CPC .................................................. G06F 3/0481
See application file for complete search history.

(56) References Cited

U.S. PATENT DOCUMENTS

| | | |
|---|---|---|
| 5,754,939 A | 5/1998 | Herz et al. |
| 5,793,365 A | 8/1998 | Tang et al. |
| 5,794,006 A | 8/1998 | Sanderman |
| 5,796,393 A | 8/1998 | MacNaughton et al. |
| 5,799,151 A | 8/1998 | Hoffer |
| 5,828,839 A | 10/1998 | Moncreiff |

(Continued)

FOREIGN PATENT DOCUMENTS

| | | | |
|---|---|---|---|
| WO | 02093414 A1 | 11/2002 | |
| WO | WO 02093414 A1 * | 11/2002 | ......... G06F 17/2785 |

OTHER PUBLICATIONS

U.S. Appl. No. 10/279,088, , "Non-Final Office Action", dated Aug. 6, 2008, 9 pages.

(Continued)

*Primary Examiner* — Tadesse Hailu
*Assistant Examiner* — Andrew Chung
(74) *Attorney, Agent, or Firm* — Kilpatrick Townsend & Stockton LLP

(57) ABSTRACT

A method and system for conducting a chat session with multiple chat members. The chat system receives chat comments from the chat members. The chat system attempts to identify a topic or subject of the chat comment. The chat system may then retrieve product or product category advertisements relevant to the identified topic. The chat system then effects the display of the chat comment along with the retrieved advertisements to each chat member. The chat system thus dynamically recognizes the topic of chat comments and displays relevant additional information along with the chat comments.

20 Claims, 12 Drawing Sheets

(56) References Cited

U.S. PATENT DOCUMENTS

| | | | |
|---|---|---|---|
| 5,911,146 A * | 6/1999 | Johari | G06F 17/217 715/234 |
| 6,006,225 A | 12/1999 | Bowman et al. | |
| 6,141,010 A * | 10/2000 | Hoyle | G06F 8/60 715/201 |
| 6,346,952 B1 * | 2/2002 | Shtivelman | G06F 17/277 707/999.005 |
| 6,513,036 B2 * | 1/2003 | Fruensgaard | G06F 17/30867 |
| 6,606,644 B1 * | 8/2003 | Ford | G06F 17/30864 707/999.003 |
| 6,738,787 B2 | 5/2004 | Stead | |
| 6,745,178 B1 | 6/2004 | Emens et al. | |
| 6,766,374 B2 | 7/2004 | Trovato et al. | |
| 6,961,910 B2 | 11/2005 | Lee et al. | |
| 7,007,083 B1 * | 2/2006 | Chesley | H04L 12/1822 709/206 |
| 7,502,825 B2 | 3/2009 | Webb et al. | |
| 7,752,251 B1 * | 7/2010 | Shuster | G06F 16/954 709/200 |
| 8,046,259 B1 | 10/2011 | Siegel et al. | |
| 8,997,005 B1 | 3/2015 | Siegel et al. | |
| 2001/0055036 A1 * | 12/2001 | Burstrom | G06F 3/0481 715/758 |
| 2002/0005865 A1 * | 1/2002 | Hayes-Roth | G06N 5/043 715/706 |
| 2002/0007396 A1 * | 1/2002 | Takakura | H04W 4/08 709/205 |
| 2002/0016163 A1 * | 2/2002 | Burgan | H04L 12/1827 455/412.2 |
| 2002/0059272 A1 * | 5/2002 | Porter | G06F 17/3061 |
| 2002/0060988 A1 | 5/2002 | Shtivelman | |
| 2002/0072971 A1 | 6/2002 | DeBusk et al. | |
| 2002/0073162 A1 | 6/2002 | McErlean | |
| 2002/0083119 A1 | 6/2002 | Matsui et al. | |
| 2002/0097277 A1 * | 7/2002 | Pitroda | G06F 3/0483 715/854 |
| 2002/0113820 A1 * | 8/2002 | Robinson | G06F 17/30873 715/764 |
| 2002/0120619 A1 * | 8/2002 | Marso | G06Q 30/02 |
| 2002/0138588 A1 | 9/2002 | Leeds | |
| 2002/0154171 A1 | 10/2002 | Lee et al. | |
| 2003/0036944 A1 | 2/2003 | Lesandrini et al. | |
| 2003/0038884 A1 * | 2/2003 | Matsushita | H04N 1/32144 348/211.5 |
| 2003/0179222 A1 * | 9/2003 | Noma | G06F 17/30873 715/700 |
| 2003/0195928 A1 * | 10/2003 | Kamijo | H04L 12/1818 709/204 |
| 2003/0212746 A1 * | 11/2003 | Fitzpatrick | H04L 12/1827 709/206 |
| 2005/0125504 A1 | 6/2005 | Leeds | |
| 2006/0173702 A1 | 8/2006 | Saxena et al. | |
| 2008/0183587 A1 | 7/2008 | Joo et al. | |
| 2009/0030774 A1 | 1/2009 | Rothschild et al. | |

OTHER PUBLICATIONS

U.S. Appl. No. 10/279,088, , "Final Office Action", dated Mar. 6, 2009, 10 pages.

U.S. Appl. No. 10/279,088, , "Non-Final Office Action", dated Sep. 22, 2009, 9 pages.

U.S. Appl. No. 10/279,088, , "Final Office Action", dated Mar. 11, 2010, 14 pages.

U.S. Appl. No. 10/279,088, , "Non-Final Office Action", dated Jan. 13, 2011, 15 pages.

U.S. Appl. No. 10/279,088, , "Notice of Allowance", dated Jun. 2, 2011, 10 pages.

U.S. Appl. No. 13/224,260, , "Non-Final Office Action", dated Apr. 15, 2013, 17 pages.

U.S. Appl. No. 13/224,260, , "Final Office Action", dated Oct. 17, 2013, 21 pages.

U.S. Appl. No. 13/224,260, , "Non-Final Office Action", dated Feb. 25, 2014, 24 pages.

U.S. Appl. No. 13/224,260, , "Final Office Action", dated Jun. 20, 2014, 27 pages.

U.S. Appl. No. 13/224,260, , "Notice of Allowance", dated Dec. 10, 2014, 8 pages.

Morrissey. Google Rolls Out Targeted Ads [online] Internet News, Feb. 27, 2003. [Retrieved on Jul. 2, 2003]. Retrieved from the Internet: <URL: http://www.internetnews.com/IAR/print.php/1730811>, 1 page.

Get More Targeted Leads with Content March. [online] Overture, Jul. 2, 2003. [Retrieved on Jul. 2, 2003]. Retrieved from the Internet: <URL: http://www.content.overture.com/d/Usm/ac/ba/cm.jhtml>, 2 pages.

Overture Readies New Search Products. [online] Internet News, May 9, 2003 [Retrieved on Jul. 2, 2003]. Retrieved from the Internet: <URL: http://www.internetnews.com/IAR/print.php/2203901>, 1 page.

Overture Unveils New Ad Product, Content Match to Compete with Google Service. [online] Jul. 1, 2003. Retrieved from the Internet: <URL: http://editorandpublisher.printthis.clickability.com/pt/cpt?action=cpt&expire=&urlID=6797754&fb=Y&pa>, 2 pages.

* cited by examiner

METHOD AND SYSTEM FOR CONDUCTING A CHAT

CROSS-REFERENCES TO RELATED APPLICATIONS

The present application is a divisional of U.S. patent application Ser. No. 13/224,260, filed on Sep. 1, 2011 and issued to U.S. Pat. No. 8,997,005 on Mar. 31, 2015, which is a divisional of U.S. patent application Ser. No. 10/279,088, filed on Oct. 23, 2002 and issued to U.S. Pat. No. 8,046,259 on Oct. 25, 2011, the contents of which are hereby incorporated by reference in their entireties.

TECHNICAL FIELD

The described technology relates generally to conducting a computer-based chat session.

BACKGROUND OF THE INVENTION

The Internet is increasingly being used to conduct "electronic commerce." The Internet comprises a vast number of computers and computer networks that are interconnected through communications links that facilitate electronic communications between vendors and purchasers. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and widespread use of electronic commerce depends, in large part, upon the ease of use of conducting such electronic commerce and its advantages over more conventional means of commerce. If electronic commerce can be easily conducted and provides significant advantages, then users will choose to use electronic commerce. Therefore, it is important that techniques be developed that facilitate conducting electronic commerce and that provide advantages over conventional commerce.

The Internet provides a network that facilitates conducting electronic commerce because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends that web page to the client computer system. When the client computer system receives that web page, it typically displays the web page using a browser. A browser is typically a special-purpose application program that effects the requesting of web pages and the displaying of web pages.

Currently, web pages are generally defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The WWW portion of the Internet is especially conducive to conducting electronic commerce. Many web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the available items. The items may be organized into categories and subcategories so that a user can browse the categories to find an item of interest. A user, who is a potential purchaser, may browse through the catalog using a browser and select various items for purchase. When the user has completed selecting the items to be purchased, the server computer system then prompts the user for information to complete the ordering of the items. This purchaser-specific order information may include the purchaser's name, a credit card number, and a shipping address for the order. The server computer system then typically confirms the order by sending a confirming web page to the client computer system and schedules shipment of the items.

Although the use of the WWW is expanding rapidly because it facilitates the buying and selling of goods through electronic commerce, the WWW also makes easily accessible vast amounts of information that are not directly related to electronic commerce. For example, a public library may make its catalog of books available through the WWW. A person can browse through the catalog to identify available books on a certain topic. As another example, various news reporting organizations are publishing stories on the WWW. The news reporting organizations may or may not charge a fee for accessing their stories. Whether or not a fee is charged, the news reporting organizations may derive revenue from advertisements provided when a story is accessed.

In general, the providers of web sites want to encourage access to their web sites because, for example, they may derive revenue from such access (e.g., advertising revenues) or the access advances their goal of disseminating information (e.g., a library catalog).

When a user locates information on the WWW, the user may want to share the information with other users or obtain additional information from other users. For example, some web sites allow users to write reviews about items, such as books, that are being offered for sale. Other users can then read the reviews in hopes of making a more informed decision whether or not to purchase the item. Such reviews, however, are not interactive. A user who reads a review cannot easily ask a follow-up question of the reviewer or add follow-up comments of their own. In addition, reviews may reflect a reviewer's position several days or weeks ago and may not reflect current assessment of a product. For example, a reviewer may have indicated two months ago that a certain book was the best book on the market but now believes that a newer book is better. It would be desirable to have a mechanism that would allow users to exchange information about items or categories in real time. In addition, it would be desirable for a web site to provide additional information to the users that is related to the topic of their information exchange.

DETAILED DESCRIPTION OF THE INVENTION

Figure 1:
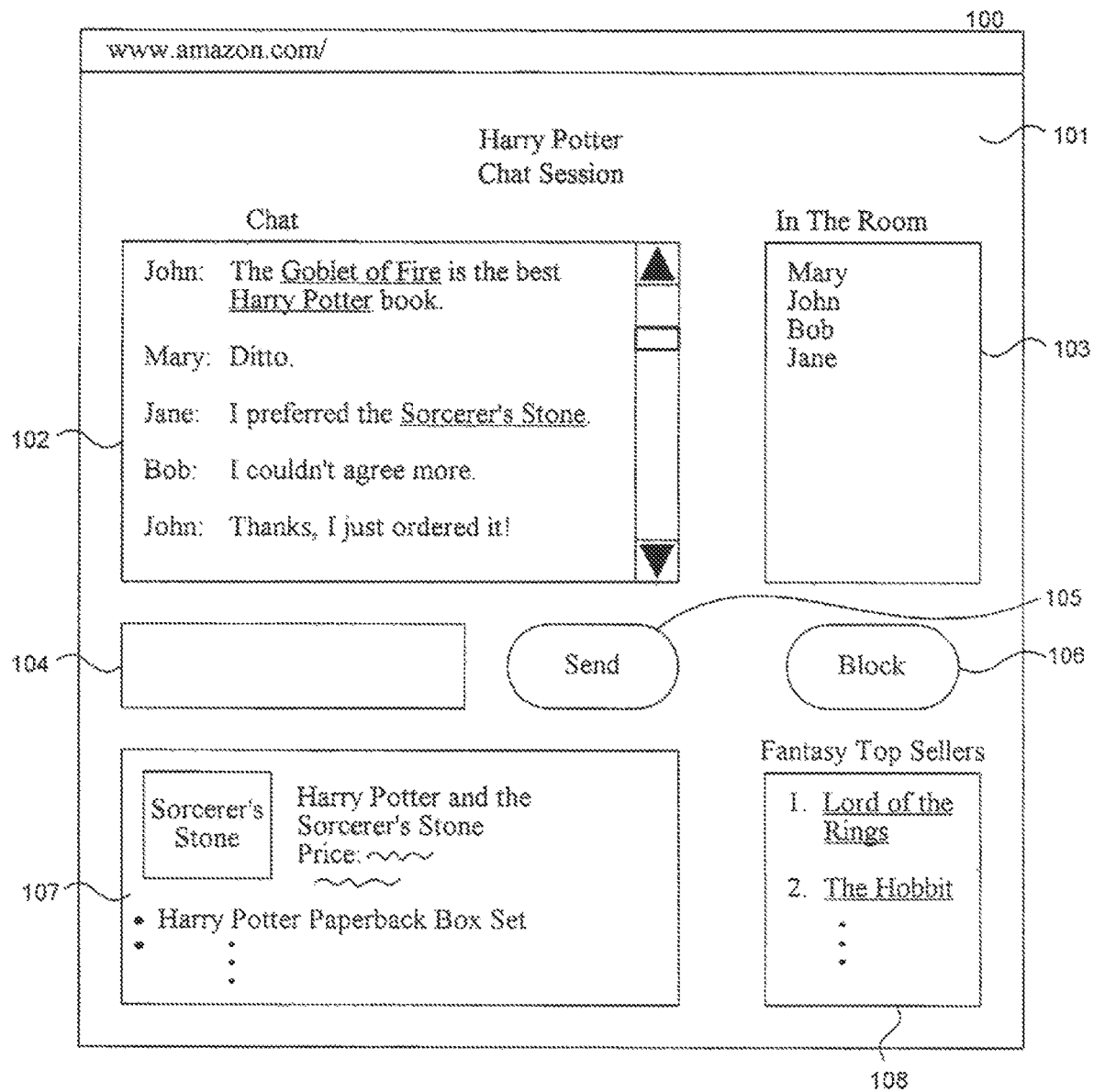
FIG. 1 illustrates an example display page for a chat session relating to a category of books in one embodiment.

A method and system for conducting a chat session with multiple chat members is provided. In one embodiment, the chat system receives chat comments from chat members. The members may provide their chat comments by typing or speaking their comments, or by any means by which comments can be provided by chat members. Once the chat system receives a chat comment from a chat member, it attempts to identify a product or item associated with the chat comment. For example, the chat comment may be "Harry's magic is powerful." Based on this comment, the chat system may infer that the topic of this chat comment is Harry Potter books and may retrieve an advertisement for the book entitled *Harry Potter and the Sorcerer's Stone*. The chat system then effects the display of the chat comment along with the retrieved information to each chat member. In this way, the chat system dynamically recognizes products or items pertaining to chat comments and displays relevant information along with the chat comment.

In one embodiment, the chat system interacts with an e-commerce web site through which items can be purchased. (Although the chat system is described as operating in conjunction with an e-commerce web site in one embodiment, one skilled in the art will appreciate that the principles of the chat system can be used in other environments. For example, a topic recognition aspect of the chat system can be used to augment conventional chat systems on content-focused web sites.) The e-commerce web site may provide a browse hierarchy that a user may use to select items of interest. For example, the top-level nodes of a browse hierarchy for a web site that sells books may include the categories of "Arts and Photography," "Children's Books," "Literature and Fiction," and so on. The child nodes for the "Children's Books" category may include a "Literature and Fantasy" subcategory. The leaf nodes of the browse hierarchy typically represent individual items, such as a book that can be purchased, in one embodiment, a chat session may be associated with any browse node within the browse hierarchy. Thus, multiple chat sessions relating to different categories or items may be simultaneously active. When a user requests the display page (e.g., web page) for a browse node that has a chat session associated with it, the web site adds to the display page an indication that a chat session is associated with the display page. The indication may be a button that when selected by the user allows the user to join the chat session.

The chat system may dynamically associate chat sessions with and disassociate chat sessions from browse nodes. For example, if a chat session associated with a browse node consistently has too many members requesting to join the chat, then the chat system may associate chat sessions with the child nodes (or other descendent nodes) of that browse node. Members that would therefore typically join the chat session for the parent node may instead join in the chat sessions of one of the child nodes. Similarly, if a chat session associated with a child node rarely has members joining in a chat, then the chat system may associate a chat session with the parent node (or other ancestor node) and disassociate the chat session from the child node and optionally its sibling nodes. The chat system therefore allows traffic to be dynamically distributed or aggregated in accordance with the popularity of the particular chat node. More generally, chat sessions may be associated with any browse node and a path of browse nodes may have sessions associated with or not associated with each browse node along the path.

In one embodiment, the chat system recognizes the topic of a chat comment based on results of queries previously submitted by users. Such recognition is experience-based in the sense that it relies on analysis of previous user interactions to help identify the topic of a chat comment. E-commerce web sites typically allow users to submit queries to locate items of interest as an alternative to browsing through the browse hierarchy to find items of interest. For example, a user trying to locate Harry Potter-related books may type in the query "Harry." In response, the web site may provide a list of books that include several books related to Harry Potter and several books related to Harry Truman. If the user selects a link to a Harry Potter book, then the web site may establish a relationship between the query "Harry" and the selected Harry Potter book. Alternatively, the relationship might only be established if the user eventually purchases the Harry Potter book, rather than when the user selects the link to the book. The web site may also record that users selected Harry Potter books 90% of the time and Harry Truman books 10% of the time. Regardless of how the web site establishes the relationship, the chat system may use the relationships between user-submitted queries and items as a basis for recognizing the topic of the chat comment.

When the chat system receives a chat comment, it may identify the user-submitted query that is most closely related to the chat comment. For example, if the chat comment is "Harry's books are great," then the chat system may determine the user-submitted query of "Harry" is the closest related query. One skilled in the art will appreciate that many different techniques may be used for determining whether a chat comment is related to a user-submitted query. For example, the chat system may identify words of interest of the chat comment and search for a user-submitted query that includes all of those words of interest. (A word of interest may be defined to be any word other than noise words such as "a," "the," "and," "with," and so on.) If such a user-submitted query is found, then the chat system assumes that the topic of the chat comment relates to the user-submitted query and retrieves information about the item related to the query that was established when the query was submitted. For example, the related item may be the book entitled *Harry Potter and the Goblet of Fire*, and the retrieved information may be an advertisement for that book. The chat system may then send the information about the related item so that it can be displayed to each chat member along with the chat comment. If the same user-submitted query is related to different items (e.g., a Harry Potter book and a Harry Truman book), then the chat system may select one of the items based on various techniques. The chat system may select the item, for example, based on how many times it was selected as a result of the query, how recently it was selected, or the topic of other chat comments in the chat session.

One skilled the art will appreciate that many different techniques and combinations of techniques may be used for recognizing the topic of a chat comment. In an alternate embodiment, the chat system recognizes the topic of a chat comment based on comparison between words of interest in the chat comment and words of interest in the title or description of items. Such recognition is referred to as "description-based recognition." For example, the words of interest for the book entitled *Harry Potter and the Sorcerer's Stone* may be "Harry," "Potter," "Sorcerer," and "Stone." If the chat comment is "Potter's sorcerer book is great," then the chat system may identify the book *Harry Potter and the Sorcerer's Stone* as the most closely related book because it might be the only item that includes "Potter" and "sorcerer" in its title. If, however, the chat comment was "Harry Potter's books are great," then the chat system may determine that four different books include "Harry Potter" in their title. In such a case, the chat system may decide not to display information relating to any of the books because no specific book could be identified as being the most related to the chat comment. Alternatively, the chat system could randomly select one of the identified books. The chat system may also consider the topic of previous chat comments within the chat session when identifying an item that is related to the current chat comment. For example, if the previous chat comment was "His sorcerer's book is the best," then the chat system may determine that the book entitled *Harry Potter and the Sorcerer's Stone* is the most closely related, even though the current chat comment is not specific enough by itself to uniquely identify that book.

The chat system may also factor into the recognition of the topic of a chat comment various attributes of the member submitting the chat comment. For example, the chat member may have previously submitted many book reviews that users found to be very informative. In such a case, the chat system may give higher priorities to display advertisements for items identified as a result of chat comments by such a chat member. For example, the chat system may decide to only display advertisements identified from chat comments a particular chat member makes while that chat member is actively participating in the chat. Alternatively, the chat system may display such advertisements for a longer period of time. One skilled in the art will appreciate that the chat system may use many different attributes, such as age, occupation, gender, and so on when recognizing the topic of a chat comment or when selecting additional information.

FIG. 1 illustrates an example display page for a chat session relating to a category of books in one embodiment. Display page 100 includes a chat identification area 101, a chat comments area 102, a chat member list 103, a chat input field 104, a send button 105, a block button 106, an advertisement area 107, and a top sellers area 108. The chat identification area identifies the browse node with which the chat session is associated. In this example, the browse node is a non-leaf node corresponding to the Harry Potter books. The chat comments area displays the recent chat comments submitted by the chat members. The chat comments area may also include a scroll bar to allow a chat member to review previous chat comments. In this example, the first chat comment by the chat member named John is "The *Goblet of Fire* is the best Harry Potter book." The chat system displayed that chat comment with the phrase "Harry Potter" representing a link (as indicated by the underlining) to a display page that contains information relating to Harry Potter products and a link (as indicated by the underlining) to a display page that contains information related to the book entitled *Harry Potter and the Goblet of Fire*. The chat system in one embodiment may attempt to identify words or phrases of a chat comment that may serve as a link to relevant information. In this example, when a chat member selects the link "Harry Potter" in John's chat comment, then a display page listing all Harry Potter-related products may be displayed.

A chat member submits a chat comment by entering the chat comment in the chat input field 104 and then selecting the send button 105. When the chat system receives the chat comment, it attempts to identify its topic and may display an advertisement for an item related to the topic in the advertisement area 107. The chat member list 103 contains the names of the chat members currently participating in the chat session. The chat system may allow each chat member to block chat comments from other chat members. For example, if the chat member Bob found John's comments to be annoying or irrelevant, then Bob could block John's comments by selecting John's name in the chat member list and then selecting the block button 106. When the chat system then receives comments from John, it will not send those comments to Bob.

The advertisement area 107 contains an expanded advertisement for the most recently identified related item and compressed advertisements for the previously identified items. In this example, the most recently identified item is the book entitled *Harry Potter and the Sorcerer's Stone*. The expanded advertisement includes an icon that links to a display page for the book along with the book's title, the price, and possibly a description of the book. The compressed advertisements, such as the item entitled "Harry Potter Paperback Box Set" represents a link to a display page with detailed information about the item. Thus, when a new advertisement is to be displayed, the advertisement that was previously displayed in expanded form is displayed in compressed form, and the new advertisement is displayed in expanded form. The top sellers area 108 may contain links to display pages for items that are currently top sellers at the web site. One skilled in the art will appreciate that the layout of the illustrated display pages are examples of possible display pages. The actual layouts can be varied based on user preferences, user interface criteria, and so on. For example, the related information (e.g., advertisement) may be displayed in a separate pop-up window.

Figure 2:
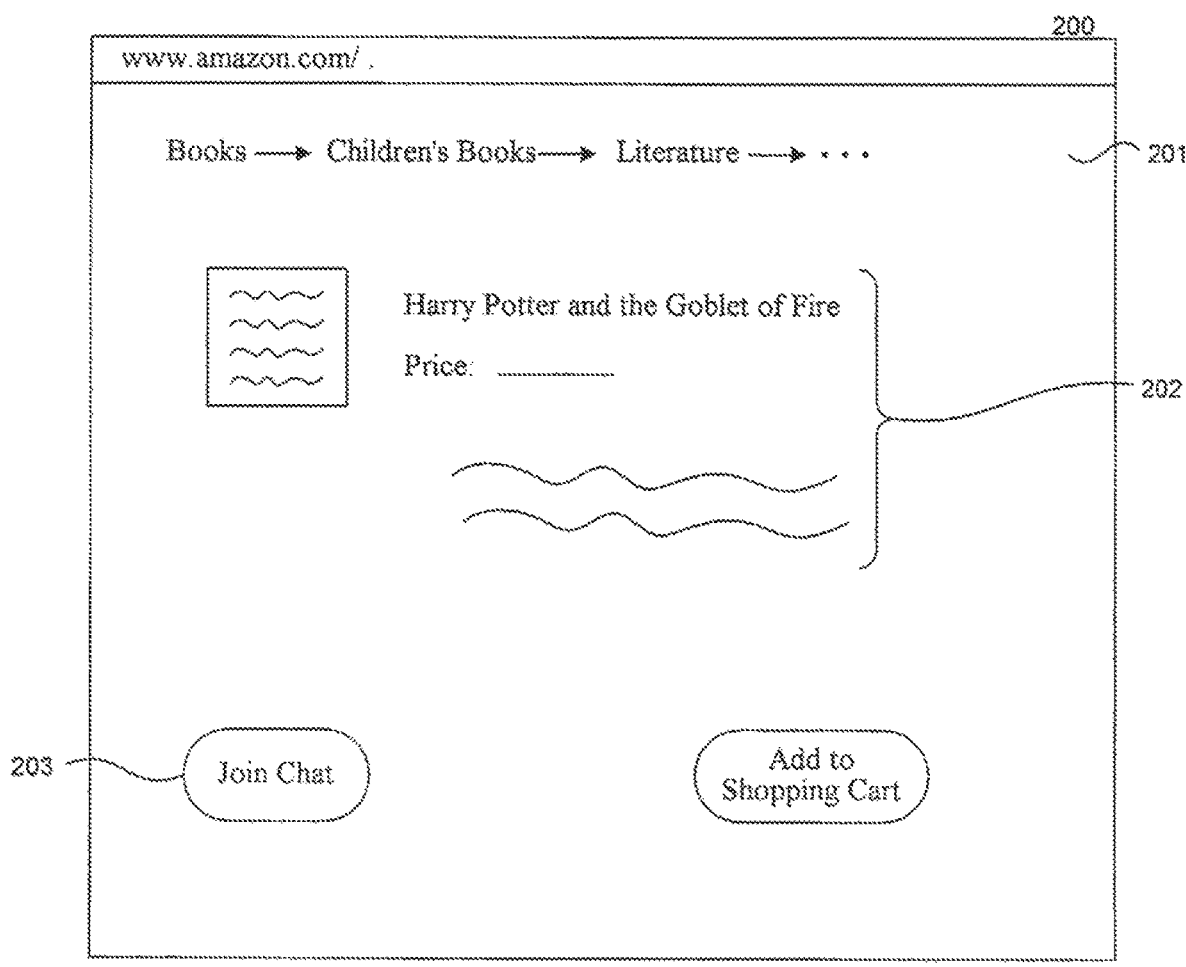
FIG. 2 illustrates an example display page for a detailed item that includes an invitation to join a chat session associated with that item.

FIG. 2 illustrates an example display page for a detailed item that includes an invitation to join a chat session associated with that item. The display page 200 includes a browse path area 201, an item description area 202, and a join chat button 203. In this example, the user browsed through the browse hierarchy from the "Books" category to the "Children's Books" category to the "Literature" category, and so on until an item was identified. The item description area 202 identifies the item. The join chat button 203 indicates that a chat session exists that is related to this item or leaf node. For example, the chat session may be related to all the Harry Potter books or to only this Harry Potter book in particular. When a user selects the join chat button, the chat system displays a display page that allows the user to log on as a chat member of the chat session. After logon is complete, then the chat system provides a display page such as display page 100 to the chat member.

Figure 3:
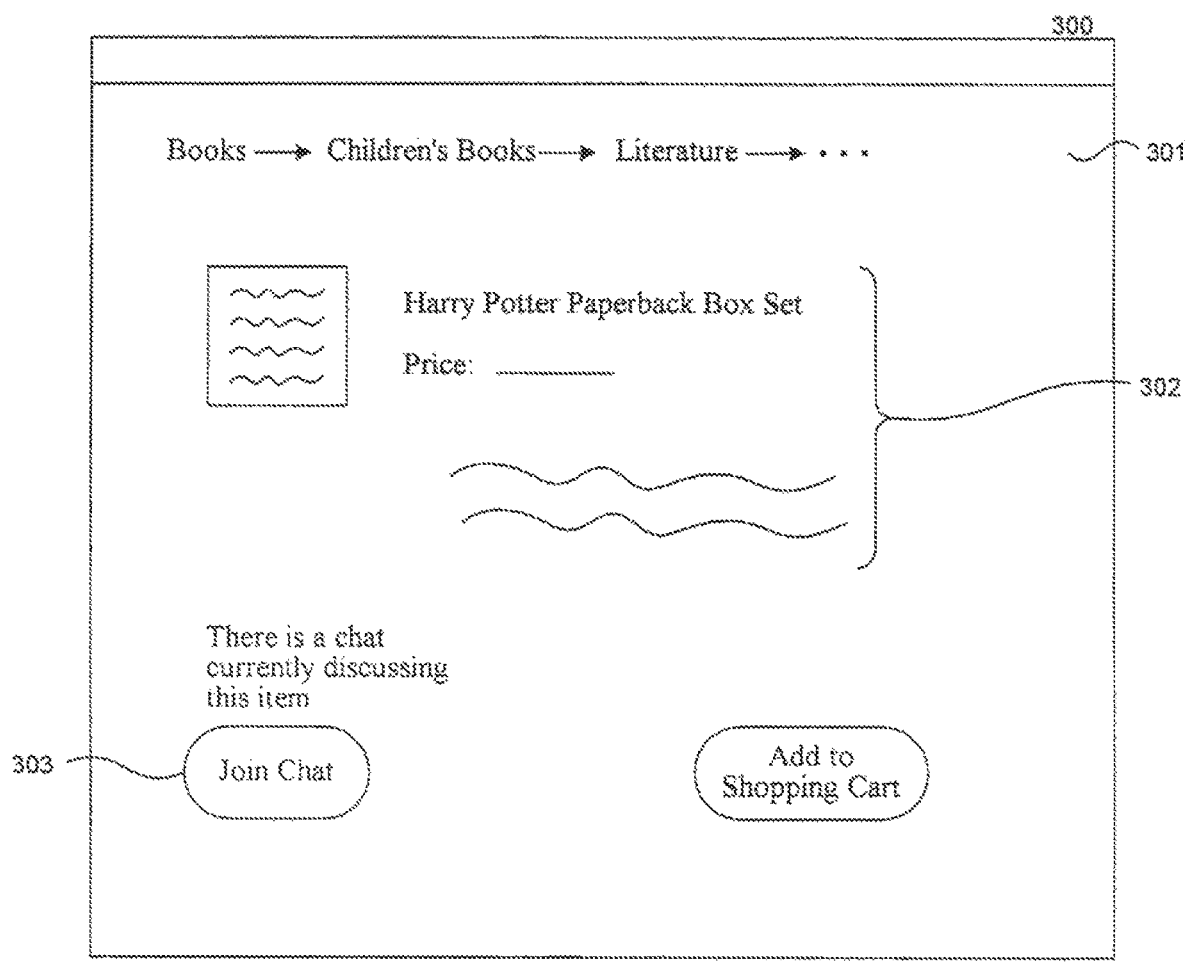
FIG. 3 illustrates an example display page for an item that identifies that a chat session is ongoing that is associated with this particular item.

FIG. 3 illustrates an example display page for an item that identifies that a chat session is ongoing that is associated with this particular item. The display page 300 includes a browse path area 301, an item description area 302, and a join chat button 303. The display page 300 is a detail display page for the item entitled "Harry Potter Paperback Box Set." Referring to the advertisement area 107 of FIG. 1, the chat system determined that the topic of a chat comment was related to the item entitled "Harry Potter Paperback Box Set." The chat system displayed an advertisement for that item in the advertisement area. In addition, the chat system notified the web site that the item was a current topic of a chat session. As a result, the web site added a join chat button to the display page for that item and a sentence indicating that the product is currently being discussed. Thus, when a user selects the join chat button of FIG. 3, the user can directly log on to the chat session associated with the item. The display page may include additional information about the chat session, such as the last chat comment received or the number of chat members. If more than one chat session is currently ongoing about a particular item, then multiple join chat buttons or other links to all of the chats may be displayed to allow the user to select the chat that they would like to join. Alternatively, the chat system may make a decision about the most relevant single chat to link to based on the number of people participating in the chat, how long the chat has been ongoing, how close the chat node is to the item node in the browse hierarchy, or other relevant factor.

Figure 4:
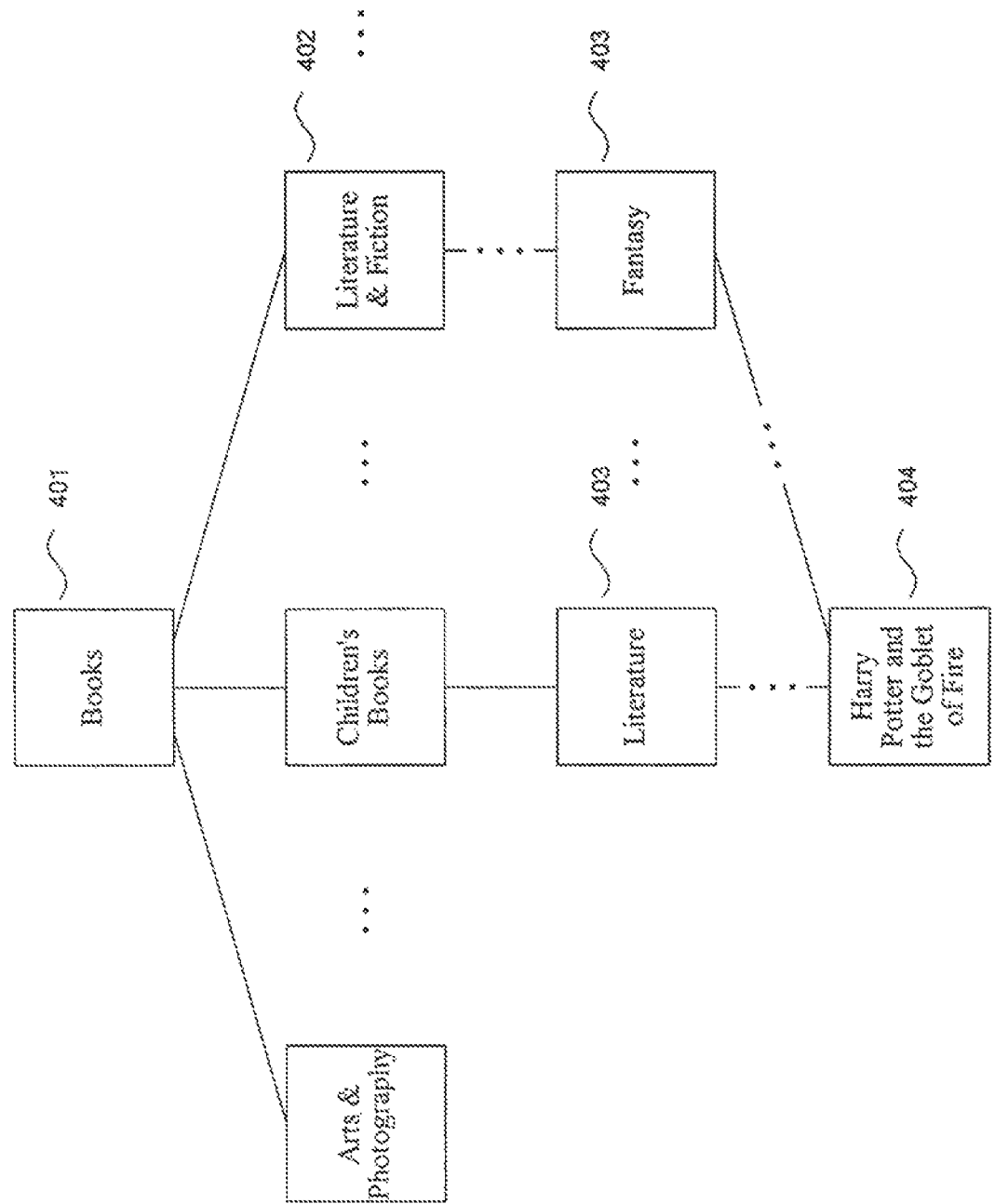
FIG. 4 is a block diagram illustrating an example browse hierarchy in one embodiment.

FIG. 4 is a block diagram illustrating an example browse hierarchy in one embodiment. A browse hierarchy may be represented, for example, by a tree data structure where each node has only one parent node or by a directed acyclic graphic data structure where each node may have more than one parent node. In this example, the root node 401 represents the "Books" category. The root node has several child nodes 402 that include "Arts and Photography," "Children's Books," and "Literature and Fiction" categories. In this example, the leaf node 404 represents the book entitled *Harry Potter and the Goblet of Fire*. As shown in this example, the leaf node has two parent nodes 403. As a result, this browse hierarchy is represented by a directed acyclic graph data structure, rather than a tree data structure.

Figure 5:
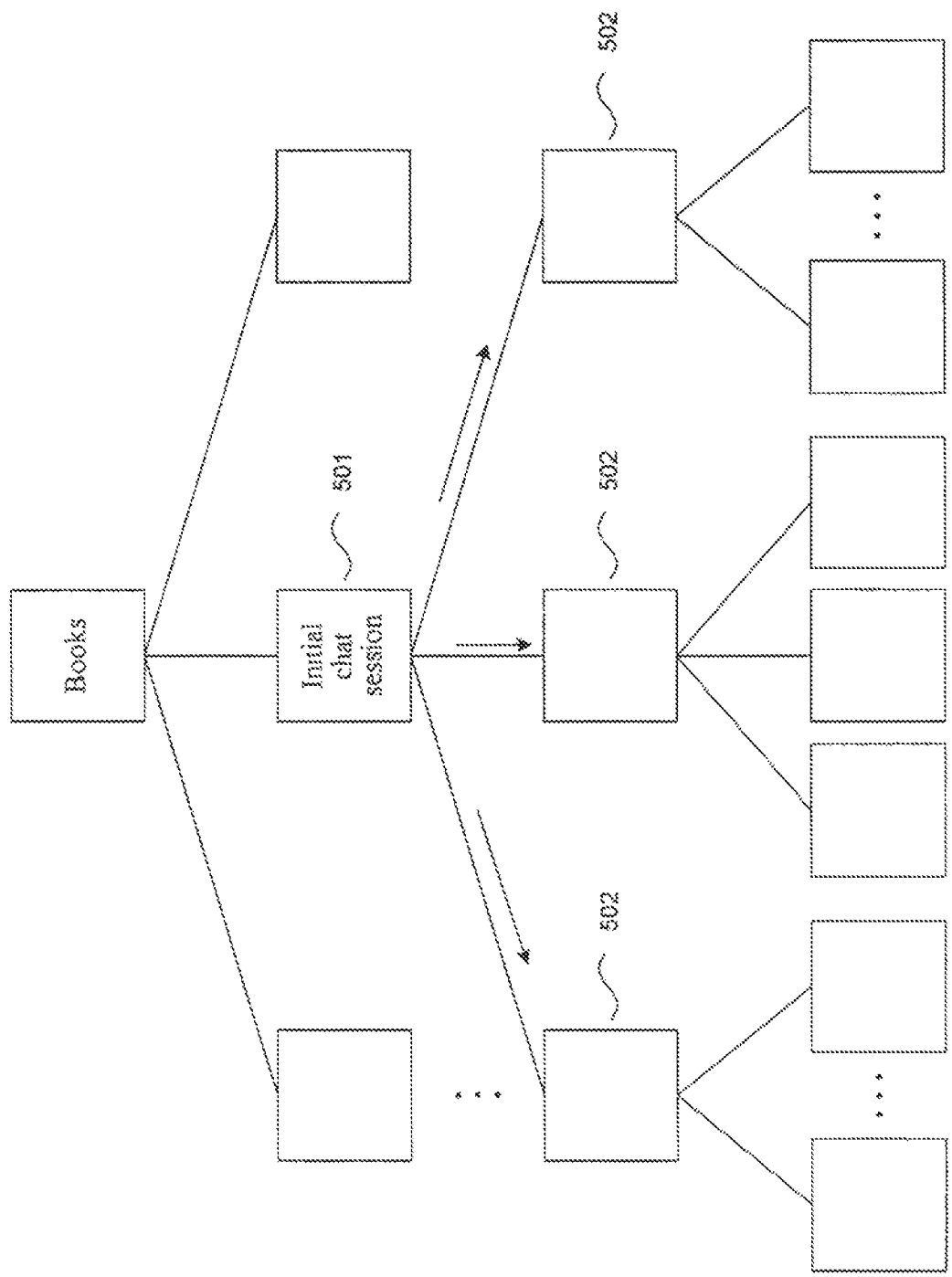
FIG. 5 is a block diagram illustrating the dynamic association of chat sessions with nodes of a browse hierarchy.

FIG. 5 is a block diagram illustrating the dynamic association of chat sessions with nodes of a browse hierarchy. Initially, browse node 501 has a chat session associated with it. As a result, whenever the web site serves a display page associated with that browse node, it includes a link through which the user can join the chat session. If, however, the chat system determines that it would be appropriate to have chat sessions associated with the child nodes 502, then the chat system notifies the web site that chat sessions are now associated with the child nodes. The chat system may make this determination based on the number of chat members associated with the chat session of a node, for example, if the number of chat members exceeds a predefined number. Alternatively, the chat system may determine that the current topic of a chat session is more closely related to the category of a child node. In such a case, the chat system may notify the web site that a new chat session has been associated with one of the child nodes. In such a case, the chat system may leave the chat session associated with the parent node resulting in two chat sessions: one associated with the parent node for a more general topic and one associated with the child node for a more specific topic. The chat system may also dynamically determine that a chat session should be associated with a parent node, rather than with each of the child nodes. For example, when a child node has only one or two chat members, then the chat system may associate a new chat session with a parent node (if a chat session is not already associated with the parent node) and disassociate the chat sessions from some or all of the child nodes. Such dynamic association may be done in real time or periodically (e.g., once an hour or once a day) based on observed usage patterns.

Figure 6:
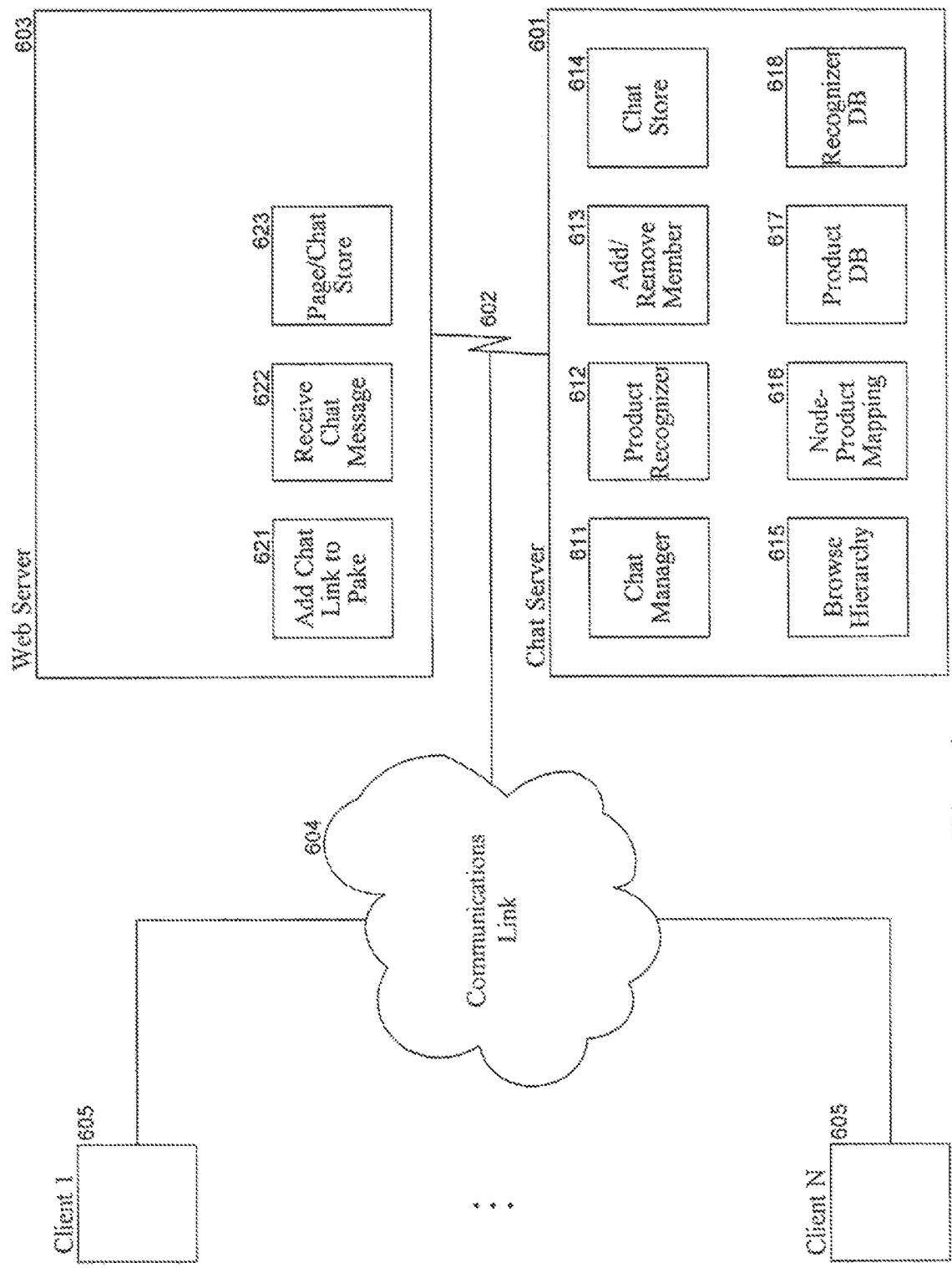
FIG. 6 is a block diagram illustrating components of a chat system in one embodiment.

FIG. 6 is a block diagram illustrating components of a chat system in one embodiment. The chat system may be implemented on a chat server 601 that is linked via communications link 602 to web server 603 and linked via communications link 604 to client computers 605. The chat server may periodically send information to the web server via communications link 602 indicating which browse nodes in the browse hierarchy have chat sessions associated with them (and which browse nodes may be related to the topic of a chat session associated with another browse node). When the web server sends a display page associated with such browse nodes to client computers via communications link 604, it adds a button allowing the user to join the chat session. When a user at a client computer 605 selects that button, a request is sent to the chat server for a display page that will enable the user to log on to the chat session. In response, the chat server provides the logon display page to the requesting client computer. The chat server may periodically send messages indicating which browse nodes have associated chat sessions. If the web server stops receiving those messages for a browse node, then it may assume the chat system has disassociated the chat session from that browse node and may stop adding the join chat links to the display page of the browse node. In certain embodiments, there may be multiple chat servers, and each server may independently send such messages to the web server(s).

The chat system may include a chat manager component 611, a product recognizer component 612, an add/remove member component 613, a chat store 614, a browse hierarchy 615, a node/product mapping 616, a product database 617, and a recognizer database 618. The chat manager component 611 receives requests from users to join and leave chat sessions, receives chat comments from the chat members, identifies product or product category advertisements related to the chat comments, and distributes the chat comments and advertisements to each chat member of the chat session. The product recognizer component 612 receives a chat comment and identifies a product or product category from the product database that may be related to that chat comment. The product recognizer component may identify a topic of a chat comment based on information stored in the recognizer database 618. The recognizer database may contain mappings of user-submitted queries to product identifications. The add/remove member component 613 adds members to and removes members from chat sessions. The chat store 614 may contain a list of the chat comments and advertisements associated with each chat session. When a user joins a chat session, the chat system may provide the new member with a list of previous chat comments associated with that chat session. The chat system may, for example, only provide the ten most recent chat comments to a new member. In such a case, the chat system may only store the ten most recent chat comments for each chat session. The browse hierarchy 615 of the chat server describes the browse hierarchy of the web server. The chat system uses the browse hierarchy when chat sessions are dynamically associated and disassociated with browse nodes. The node/product mapping 616 contains a list of those products that may be advertised during a chat session associated with that browse node. By limiting the advertisements for a browse node to a set of products, the chat system can ensure that a chat member who strays from the overall topic of the chat session will not cause spurious advertisements to be displayed. For example, a browse node for a certain Harry Potter book may only have products directly related to Harry Potter books associated with it. Thus, if a chat member starts commenting on the trilogy entitled *The Lord of the Rings*, the chat system will not display any advertisements for those books. The product database 617 may contain the advertisement information for the products associated with the leaf nodes of the browse hierarchy.

It will be appreciated that different techniques may be used to supplement or restrict those products whose advertisements are displayed by the chat server 601. In one embodiment, the chat system may regulate the display of advertisements based on the attributes of the chat member. For example, advertisements unrelated to the current browse node might be displayed when the chat member is a highly regarded reviewer or is designated as a moderator or facilitator of chat sessions. In one embodiment, the chat system may pace the rate at which the topics of chat comments are recognized. For example, the chat system may maintain a circular queue of the most recently reviewed chat comments. At a specified time interval (e.g., one-tenth of a second), the chat system will recognize the oldest topic in the queue and select the related advertisement as appropriate. If the chat system supports many chat sessions, then chat comments may get overwritten and never recognized. The chat system will, however, continue to function without being overloaded. One skilled in the art will appreciate that various additional techniques can be used to schedule a chat comment for recognition. For example, the chat system may give scheduling preference to chat sessions that have had the same advertisements displayed for an extended period of time. In this way, the chat system can ensure that a chat session will have new advertisements displayed periodically though the previously displayed advertisement might have been for the item most relevant to the topic of the chat session.

In one embodiment, the chat system may download client code to each client computer to facilitate the conducting of a chat session. The client code may work in conjunction with a standard browser to allow chat members to enter chat comments, receive chat comments and related advertisements from the chat server, and display the chat comments and related advertisements.

The web server 603 may include an add chat link to page component 621, a receive chat message component 622, and a page/chat store 623. The receive chat message component 622 receives from the chat server messages indicating browse nodes that have associated chat sessions or that may be related to the topic of a chat session associated with another browse node. The receive chat message component may store this information in the page/chat store 623. The add chat link to page component 621 may be invoked whenever a display page is generated to determine, based on information in the page/chat store, whether a link to a chat session should be added to the display page.

The client computers, the web server, and the chat server may include a central processing unit, memory, input devices (e.g., keyboard and pointing devices), output devices (e.g., display devices), and storage devices (e.g., disk drives). The memory and storage devices are computer-readable media that may contain instructions that implement the chat system. In addition, the data structures and message structures may be stored or transmitted via a data transmission medium, such as a signal on a communications link. Various communications channels other than the Internet may be used, such as a local area network, a wide area network, or a point-to-point dial-up connection.

Figure 7:
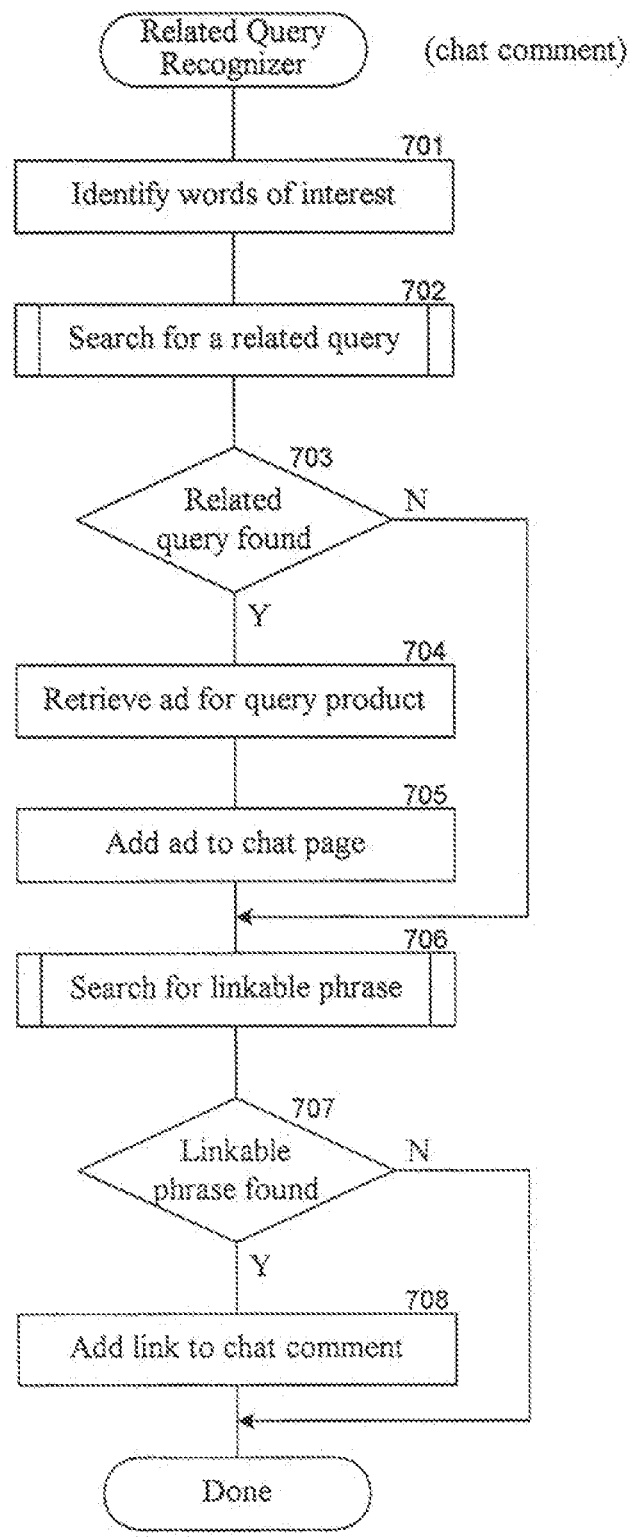
FIG. 7 is a flow diagram illustrating the recognition of a topic for a chat comment based on user-submitted queries.

FIGS. 7-12 are flow diagrams illustrating the process of components of the chat system in one embodiment. FIG. 7 is a flow diagram illustrating the recognition of a topic for a chat comment based on user-submitted queries. This experience-based recognizer uses a mapping of user-submitted queries to items (products or product categories). One skilled in the art will appreciate that the mapping of user-submitted queries to items may be replaced by any mapping of topics to items regardless of how the mapping is generated. The use of user-submitted queries may be advantageous because the mappings can be automatically generated from queries previously submitted by users. The recognizer is passed a chat comment and identifies the user-submitted query most closely related to the chat comment. The recognizer then returns an indication of the item associated with that user-submitted query. The recognizer may also ensure that the relatedness of the chat comment to the user-submitted query exceeds a certain threshold so that marginally related items are not identified. In block 701, the recognizer component identifies the words of interest in the chat comment. The words of interest may be defined to be any word that is not a noise word. In block 702, the component invokes a routine to search for the user-submitted query that is most closely related to the chat comment. In decision block 703, if a closely related query is found, then the component continues at block 704, else the component continues at block 706. In block 704, the component retrieves an advertisement for the product associated with the most closely related query. In block 705, the component adds the advertisement to the chat page. In blocks 706-708, the component optionally determines whether any of the words or phrases of the chat comment can be converted into links to a display page with relevant information. In block 706, the component invokes a routine to search for linkable words in the chat comment. In one embodiment, the linkable words may be linked to relevant advertisements that are not selected to be explicitly displayed during the chat session. For example, the chat system may limit the frequency at which new advertisements are displayed during a chat session. In such a case, the chat system may link a chat comment to a very relevant advertisement that is not explicitly displayed because of the frequency limitation. In decision block 707, if a linkable phrase is found, then the component continues at block 708, else the component completes. In block 708, the component adds the link to the chat comment and then completes.

Figure 8:
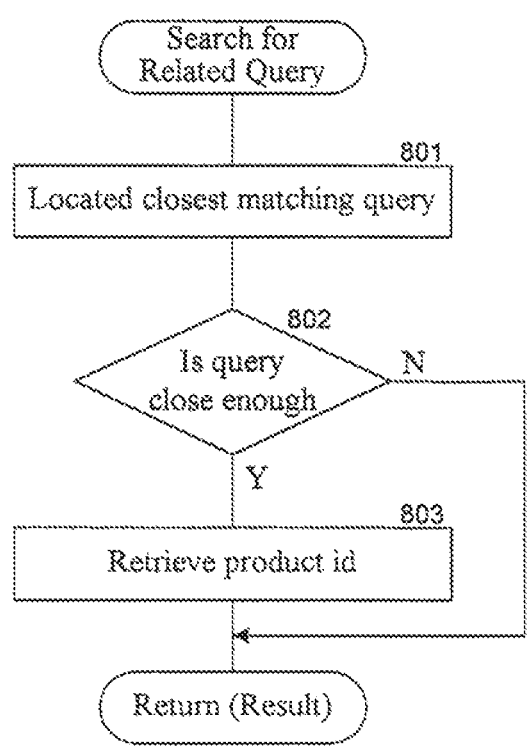
FIG. 8 is a flow diagram illustrating the process of searching for a related query in one embodiment.

FIG. 8 is a flow diagram illustrating the process of searching for a related query in one embodiment. This component is passed the words of interest from a chat comment and identifies the most closely related user-submitted query. The component then returns an indication of the item associated with that user-submitted query. In one embodiment, the component may ensure that the relatedness exceeds a certain threshold before returning an indication of the item. In block 801, the component locates the closest related user-submitted query. The component may use various metrics to determine the relatedness of the user-submitted queries to the words of interest. For example, the component may ensure that the user-submitted query contains all the words of interest and no other words. In an alternate embodiment, the component may select the user-submitted query that contains more of the words of interest than any other query. In decision block 802, if the relatedness between the chat comment and the user-submitted query exceeds a threshold, then the component continues at block 803, else the component returns an indication that no item was found. One skilled in the art will appreciate that the threshold may be dynamic. For example, at the start of a chat session, the threshold may be low to ensure an advertisement is quickly selected. Later on, the threshold may be increased to ensure that only very relevant advertisements are selected. In block 803, the component retrieves and returns the product identifier.

Figure 9:
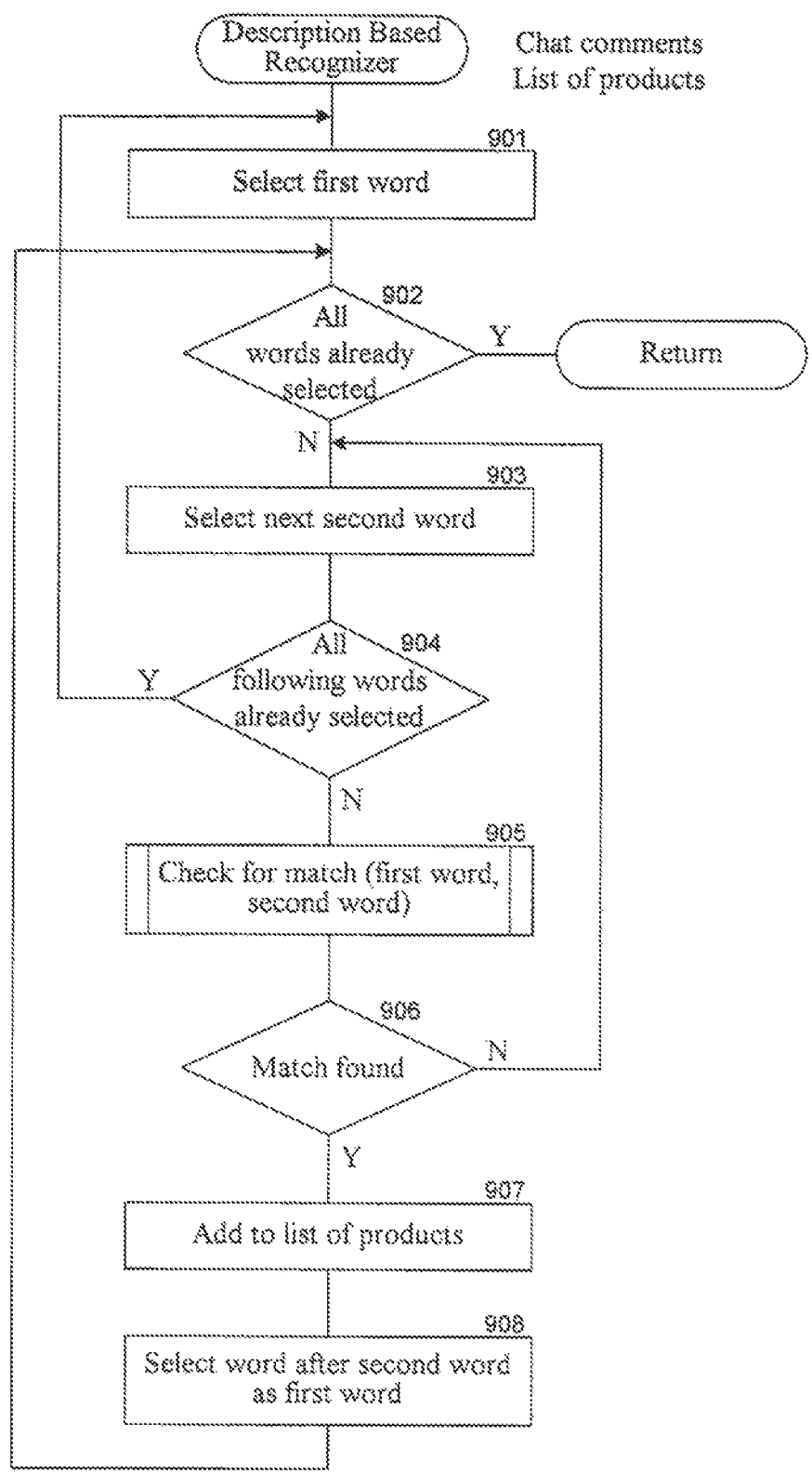
FIG. 9 is a flow diagram illustrating the recognition process based on the description of the items stored in the product database.

FIG. 9 is a flow diagram illustrating the recognition process based on the description of the items stored in the product database. This description-based recognizer component is passed a chat comment and returns a list of products that may be related to the chat comment. In one embodiment, the component identifies pairs of words of interest of the chat comment. If only one product is associated with a pair of words of interest, then that product is identified as related. If, however, a pair of words is associated with multiple products, then the component assumes that the pair of words is not specific enough and continues analyzing the next pair of words. When a product is identified, then the component may continue analyzing the chat comment starting with the words following the pair of words. As a result, multiple products may be identified. If so, the chat system may use various techniques to select one of the products as most closely related. For example, a product related to two pairs of words may be more relevant than a product related to only one pair of words of the chat comment. In blocks 901-908, the component loops, selecting each word of interest of the chat comment as the first word of the pair and each following word as the second word of the pair. In block 901, the component selects the next word of interest of the chat comment as the first word of the pair. In decision block 903, if all the words of interest have already been selected as the first word, then the component returns, else the component continues at block 903. In block 903, the component selects as the second word of the pair the next following word that has not yet been paired with the currently selected first word. In decision block 904, if all the following words have already been paired with the currently selected first word, then the component loops to block 901 to select the word following the current first word as the next first word, else the component continues at block 905. In block 905, the component invokes a routine to check whether the first word and the second word match to a specific product. In decision block 906, if a match to specific product is found, then the component continues at block 907, else the component loops to block 903 to select the word following the current second word as the next second word. In block 907, the component adds an identifier of the product to a list of products to be returned. In block 908, the component selects the next word after the currently selected second word as the next first word and loops to block 902.

Figure 10:
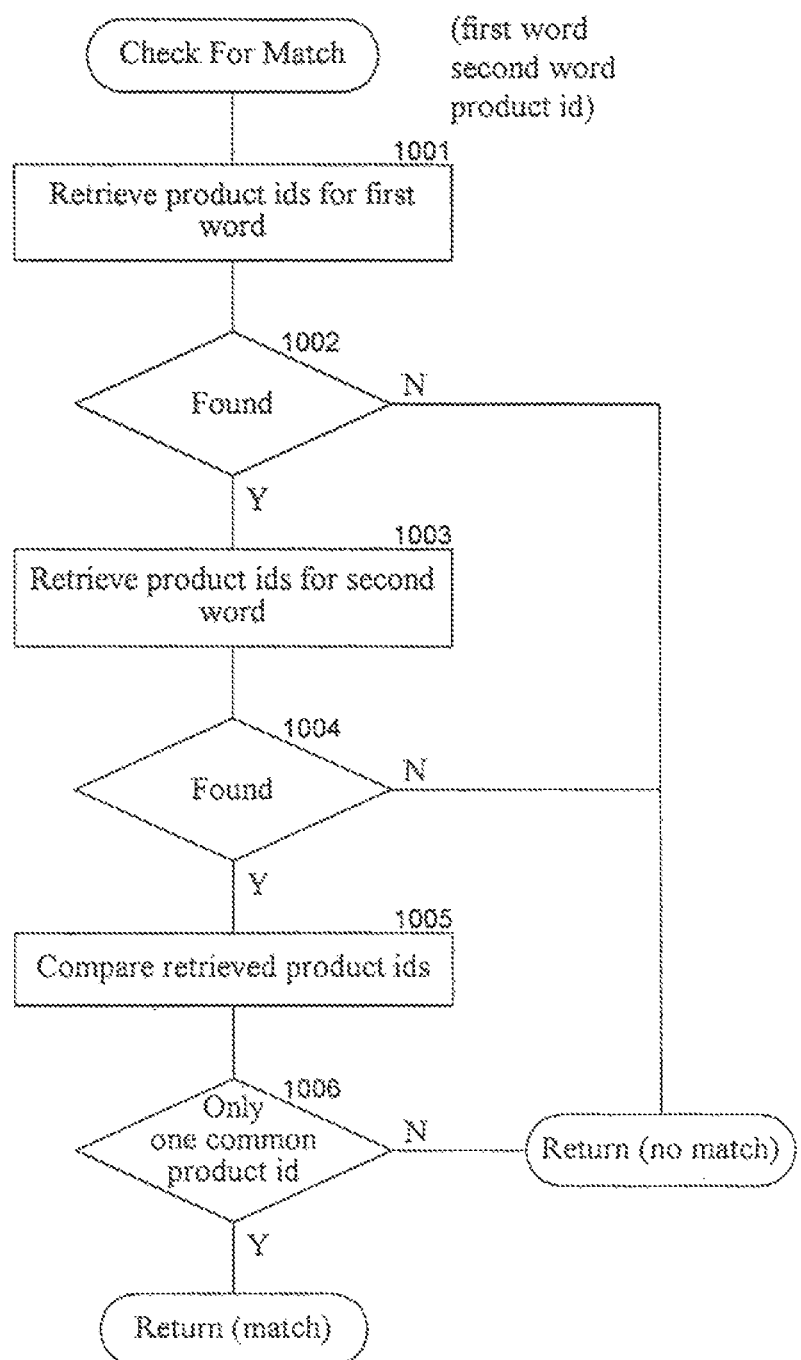
FIG. 10 is a flow diagram illustrating the processing of a component to check for a specific match for a pair of words in one embodiment.

FIG. 10 is a flow diagram illustrating the processing of a component to check for a specific match for a pair of words in one embodiment. The component is passed the first and second words of the pair and returns the identifier of the specific product that matches. The component uses a mapping of words to product identifiers of products whose descriptions and/or titles include those words. In block 1001, the component retrieves the product identifiers associated with the first word of the pair. In decision block 1002, if some product identifiers are found, then the component continues at block 1003, else the component returns an indication that no match was found. In block 1003, the component retrieves the product identifiers associated with the second word of the pair. In decision block 1004, if a product identifier is found, then the component continues at block 1005, else the component returns an indication that no match was found. In block 1005, the component compares the retrieved product identifiers to determine whether there is only one product in common between the two lists of identifiers. In decision block 1006, if only one product identifier is in common, then the component returns that product identifier and an indication of a match, else the component returns an indication of no match. One skilled in the art will appreciate that rather than comparing pairs of words, this recognizer could check a single word at a time or three or more words at a time. In addition, the chat system may augment recognition by using stemming, thesaurus functions, and other query-based techniques.

Figure 11:
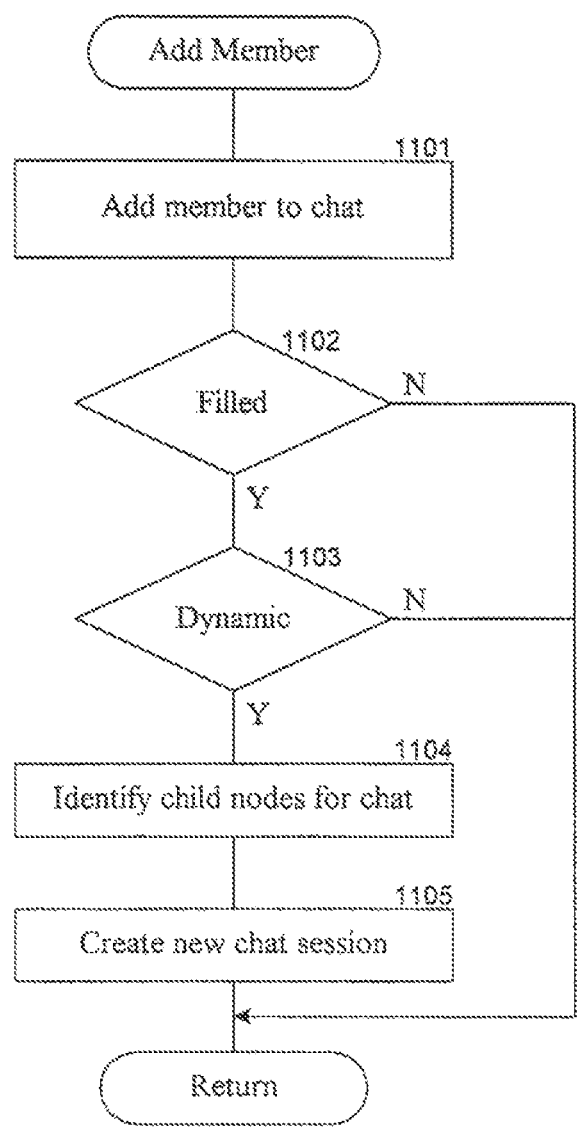
FIG. 11 is a flow diagram illustrating the process of adding a new member to a chat session in one embodiment.

FIG. 11 is a flow diagram illustrating the process of adding a new member to a chat session in one embodiment. When a new member is added to a chat session, the chat system may determine whether additional chat sessions should be identified with child nodes based on the number of members now in the chat session. In block 1101, the new member is added to the chat session. In decision block 1102, if the addition of the new member fills the capacity of the chat session, then the component continues at block 1103, else the component returns. In decision block 1103, if the chat sessions are dynamic (e.g., can have a chat session dynamically associated with child or parent nodes), then the component continues at block 1104, else the component returns. In those systems where chat sessions are not frequently created, the chat session associated with the node is now considered filled and no new members will be allowed to join unless one or more members leave the chat session. The chat system may periodically evaluate those nodes that consistently have full chat sessions to change the allocation and location of chat session nodes over time. Such an evaluation may take place at longer intervals, for example, once every twenty-four hours.

In systems where chat sessions are assigned more frequently, in block 1104, the component identifies the child nodes. The component then creates chat sessions associated with one or more of those child nodes or alternatively creates chat sessions with one or more other unrelated nodes that are the topic of the ongoing chat in block 1105. The component then returns. In one embodiment, the component notifies the chat members of the parent node of the creation of the chats at the child or other nodes and allows the members to opt in to join the chat in the child or other nodes.

In another embodiment, the chat system may leave the chat session associated with the parent node until all chat members leave that chat session, but not allow new chat members to join that chat session (e.g., by no longer sending a message to the web server that a chat session is associated with the parent node). Once all the chat members have left the chat session, the chat system may disassociate that chat session from the parent node. Alternatively, chat sessions at the parent node and the child nodes may all be allowed to continue if in doing so the chat load remains more equally balanced across the nodes.

Figure 12:
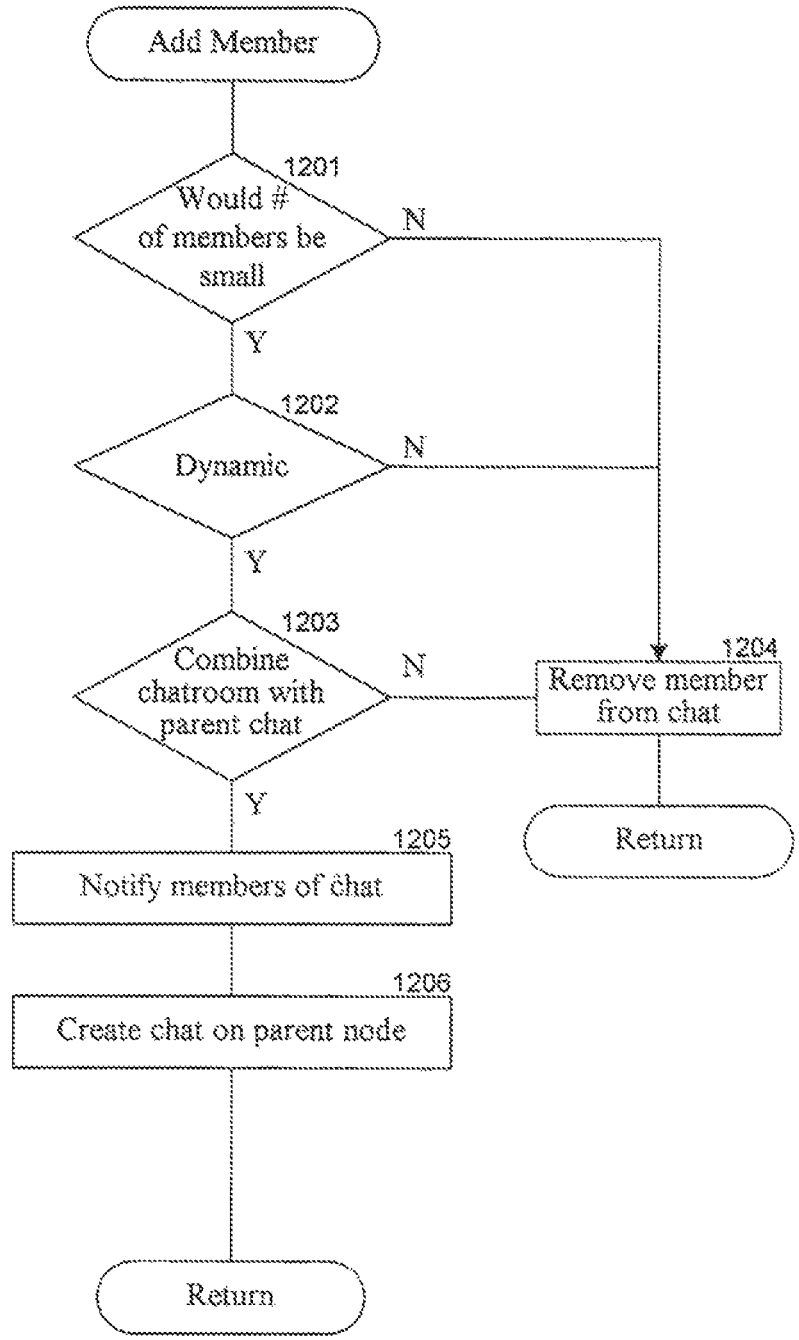
FIG. 12 is a flow diagram illustrating the process of removing a chat member from a chat session in one embodiment.

FIG. 12 is a flow diagram illustrating the process of removing a chat member from a chat session in one embodiment. In decision block 1201, if the number of members after the removal would be too small, then the component continues at block 1202, else the component continues at block 1204. In decision block 1202, if the chat sessions are dynamic, then the component continues at block 1203, else the component continues at block 1204. In decision block 1203, if the chat session can be moved to a parent node, then the component continues at block 1205, else the component continues at block 1204. In block 1204, the component removes the member from the chat session and then completes. In block 1205, the component notifies the members that the chat session is being moved to a parent node. In block 1206, the component creates the chat session for the parent node if it does not already exist and then returns. The chat system may not allow additional members to join the chat session of the child node by, for example, failing to notify the web site to place links to that chat session on any display pages. When the last member leaves, the chat system can disassociate the chat session from the child node.

From the foregoing, it will be appreciated that although specific embodiments of the technology have been described herein for purposes of illustration, various modifications may be made without deviating from the spirit and scope of the invention. For example, the chat system may limit the number or frequency of advertisements displayed as a result of chat comments made by each member. This may help prevent the comments of one chat member from dominating the selection of the advertisements (or other additional information). The chat system may also allow advertisements for products that are well known or with high profit margins to be displayed for a longer time period. For example, the topic of any information exchange can be recognized using an experience-based or description-based recognizer. If the information exchange is a telephone conversation, then voice recognition can be used to identify the words. The topic of the words can then be recognized and related advertisements can be presented (e.g., on a display of a cell phone). Also, topic recognition may be applied to a one-way flow of information. For example, a topic of a radio or television broadcast may be dynamically identified using voice recognition, and an advertisement can be selected based on that topic. Accordingly, the invention is not limited except by the appended claims.

What is claimed is:

1. A computer-implemented method comprising:
   maintaining, by at least one or more computer systems associated with a web site, a chat session including one or more chat comments, the chat session managed by a chat service of the web site, the web site configured to further manage an advertisement service and at least another electronic service;
   determining, by the at least one or more computer systems, a relevance of a chat member of a plurality of chat members associated with the one or more chat comments of the chat session based at least in part on previous submissions of the chat member outside of the chat session but within the web site;
   identifying, by the at least one or more computer systems, a topic associated with the one or more chat comments associated with the chat member based at least in part on other topics associated with the one or more chat comments of the chat session, attributes of the chat member including reviews submitted within the web site, and the relevance of the chat member;
   maintaining, by the at least one or more computer systems, a mapping of topics to advertisements based at least in part on the chat service and the other electronic service;
   selecting, by the at least one or more computer systems, an advertisement based at least in part on the topic and the mapping of topics to advertisements; and
   providing, by the at least one or more computer systems, the advertisement for presentation in association with the chat session based at least in part on the advertisement service.

2. The computer-implemented method of claim 1, wherein the other electronic service is configured to provide information in a browse hierarchy, wherein the chat session is associated with one or more nodes of the browse hierarchy, and wherein the mapping is maintained based at least in part on the one or more nodes.

3. The computer-implemented method of claim 2, wherein the advertisement is selected based at least in part on determining that an attribute of the advertisement is associated with the one or more nodes.

4. The computer-implemented method of claim 1, wherein the other electronic service is configured to provide information in a browse hierarchy about items offered at the web site, wherein the browse hierarchy groups the information in a plurality of nodes, wherein the chat session is associated with a node of the plurality of nodes, and wherein the advertisement is for an item associated with a set of the information grouped in the node.

5. The computer-implemented method of claim 1, wherein the attributes of the chat member includes an occupation of the chat member.

6. The computer-implemented method of claim 1, wherein the attributes of the chat member includes an amount of reviews submitted within the web site.

7. One or more non-transitory computer-readable storage media comprising instructions that, when executed on one or more processors, cause the one or more processors to perform operations comprising:
   maintaining a chat session that includes chat data, the chat session managed by a chat service of a web site, the web site configured to further manage an electronic service;
   determining a relevance of a chat member of a plurality of chat members providing the chat data in the chat session based at least in part on previous submissions of the chat member outside of the chat session but within the web site;
   identifying an interest associated with a subset of the chat data provided by the chat member based at least in part on other interests associated with the chat data, attributes of the chat member including reviews submitted within the web site, and the relevance of the chat member;
   maintaining a set of associations between interests and additional data at the web site;

determining that the additional data is associated with the interest based at least in part on the set of associations; and providing the additional data for insertion in the chat session based at least in part on the determining.

8. The one or more non-transitory computer-readable storage media of claim 7, wherein the set of associations are maintained based at least in part on historical data associated with user interactions with the web site.

9. The one or more non-transitory computer-readable storage media of claim 8, wherein the user interactions comprise queries submitted to the web site based at least in part on the electronic service.

10. The one or more non-transitory computer-readable storage media of claim 7, wherein the additional data is added to the chat session based at least in part on an advertisement service of the web site, wherein the chat service, the electronic service, and the advertisement service are managed by the web site.

11. The one or more non-transitory computer-readable storage media of claim 7, wherein the electronic service is configured to provide information organized in a browse structure, wherein the chat session is associated with a node of the browse structure, and wherein determining the additional information comprises selecting the additional information based at least in part on the node.

12. The one or more non-transitory computer-readable storage media of claim 11, wherein the node provides one or more offers for one or more items available for ordering based at least in part on the electronic service, and wherein the additional information comprises an advertisement for an item of the one or more items.

13. The one or more non-transitory computer-readable storage media of claim 7, wherein the set of associations are maintained based at least in part on mapping queries to a plurality of topics maintained by the electronic service, wherein the additional data comprises an advertisement associated with a topic of the plurality of topics, and wherein the advertisement is selected based at least in part on matching the interest and the topic.

14. The one or more non-transitory computer-readable storage media of claim 7, wherein identifying the interest comprises identifying words from the chat data and matching the words to topics maintained by the electronic service.

15. The one or more non-transitory computer-readable storage media of claim 7, wherein the chat data comprises a plurality of chat comments associated with the plurality of chat members, and wherein identifying the interest comprises:

matching one or more words of the chat comment to one or more interests maintained at the web site.

16. A system comprising:
one or more processors; and
one or more computer-readable storage media comprising instructions that, when executed on the one or more processors, configure the system to at least:
maintain a chat session that includes user chat data, the chat session managed by a chat service of a web site, the web site configured to further manage an electronic service;
determine a relevance of a chat member of a plurality of chat members providing the user chat data in the chat session based at least in part on previous submissions of the chat member outside of the chat session but within the web site;
identify a topic associated with a subset of the chat data provided by the chat member based at least in part on other topics associated with the chat data of the chat session, attributes of the chat member including reviews submitted within the web site, and the relevance of the chat member;
maintain associations between a plurality of topics and a plurality of advertisements at the web site based at least in part on the chat service and the electronic service;
determine an advertisement about the topic based at least in part on the associations; and
provide the advertisement in the chat session.

17. The system of claim 16, wherein the plurality of advertisements are available from external sources associated with one or more advertisers, wherein providing the advertisement comprises:
maintaining a queue of advertisements;
causing the advertisement to be presented in the chat session in an expanded form based at least in part on the advertisement being at an end of the queue; and
causing another advertisement of the plurality of advertisements to be presented in the chat session in a compressed form based at least in part on the other advertisement being at another end of the queue.

18. The system of claim 16, wherein the chat data comprises a plurality of chat comments, and wherein adding the advertisement comprises updating a chat comment of the plurality of chat comments to include a hyperlink to the advertisement.

19. The system of claim 16, wherein the electronic service is configured to provide information about the plurality of topics, wherein the information is organized in a plurality of nodes, and wherein the advertisement is determined based at least in part on a node of the plurality of nodes that comprises information about the topic.

20. The system of claim 19, wherein the plurality of topics are associated with one or more items, wherein the node comprises information about a particular item, and wherein the advertisement is associated with the particular item.

* * * * *